United States Patent
Ranzinger

(10) Patent No.: US 10,699,458 B2
(45) Date of Patent: Jun. 30, 2020

(54) IMAGE EDITOR FOR MERGING IMAGES WITH GENERATIVE ADVERSARIAL NETWORKS

(71) Applicant: SHUTTERSTOCK, INC., New York, NY (US)

(72) Inventor: Michael Steven Ranzinger, Boulder, CO (US)

(73) Assignee: Shutterstock, Inc., New York, NY (US)

( * ) Notice: Subject to any disclaimer, the term of this patent is extended or adjusted under 35 U.S.C. 154(b) by 89 days.

(21) Appl. No.: 16/160,204

(22) Filed: Oct. 15, 2018

(65) Prior Publication Data
US 2020/0118315 A1   Apr. 16, 2020

(51) Int. Cl.
| | | |
|---|---|---|
| G06T 11/60 | (2006.01) | |
| G06K 9/62 | (2006.01) | |
| G06F 16/51 | (2019.01) | |
| G06F 16/56 | (2019.01) | |
| G06F 16/58 | (2019.01) | |

(52) U.S. Cl.
CPC ............... *G06T 11/60* (2013.01); *G06F 16/51* (2019.01); *G06F 16/56* (2019.01); *G06F 16/5866* (2019.01); *G06K 9/6257* (2013.01); *G06K 9/6215* (2013.01); *G06K 9/6262* (2013.01); *G06T 2200/24* (2013.01)

(58) Field of Classification Search
CPC ..................................................... G06T 11/60
See application file for complete search history.

(56) References Cited

U.S. PATENT DOCUMENTS

| | | | |
|---|---|---|---|
| 10,062,173 B1 | 8/2018 | Padfield | |
| 10,210,631 B1* | 2/2019 | Cinnamon | ................ G06T 7/12 |
| 2014/0218353 A1* | 8/2014 | Solem | ..................... G06T 19/20 |
| | | | 345/419 |
| 2015/0116350 A1 | 4/2015 | Lin et al. | |
| 2017/0351935 A1* | 12/2017 | Liu | ....................... G06N 3/0454 |

(Continued)

FOREIGN PATENT DOCUMENTS

| | | |
|---|---|---|
| JP | 2016071682 | 5/2016 |
| KR | 1020070092560 | 9/2007 |

OTHER PUBLICATIONS

Notification of Transmittal of the International Search Report and the Written Opinion of the International Searching Authority, or the Declaration for PCT/US2019/054642, dated Feb. 5, 2020, 13 pages.

*Primary Examiner* — Ryan McCulley
(74) *Attorney, Agent, or Firm* — McDermott Will & Emery LLP

(57) ABSTRACT

A method including receiving a compositional constraint from a user for merging multiple images to create a canvas, is provided. The method includes finding a vector for the canvas in a merged space associated with the compositional constraint, and generating a synthetic image for the canvas based on the vector for the canvas and a generative tool trained in a generative adversarial configuration against a discriminative tool. The method also includes providing the synthetic image for the canvas to a user when the discriminative tool identifies the synthetic image as a real image. A system and a non-transitory, computer readable medium storing instructions to perform the above method are also provided.

17 Claims, 13 Drawing Sheets

(56) References Cited

U.S. PATENT DOCUMENTS

| | | | |
|---|---|---|---|
| 2018/0232451 A1 | 8/2018 | Lev-Tov et al. | |
| 2019/0096135 A1* | 3/2019 | Dal Mutto | G06T 7/0006 |
| 2019/0251401 A1* | 8/2019 | Shechtman | G06N 3/0454 |
| 2019/0286950 A1* | 9/2019 | Kiapour | G06F 16/9535 |
| 2019/0287301 A1* | 9/2019 | Colbert | G06N 3/08 |
| 2019/0295272 A1* | 9/2019 | Aksit | G06K 9/00281 |

* cited by examiner

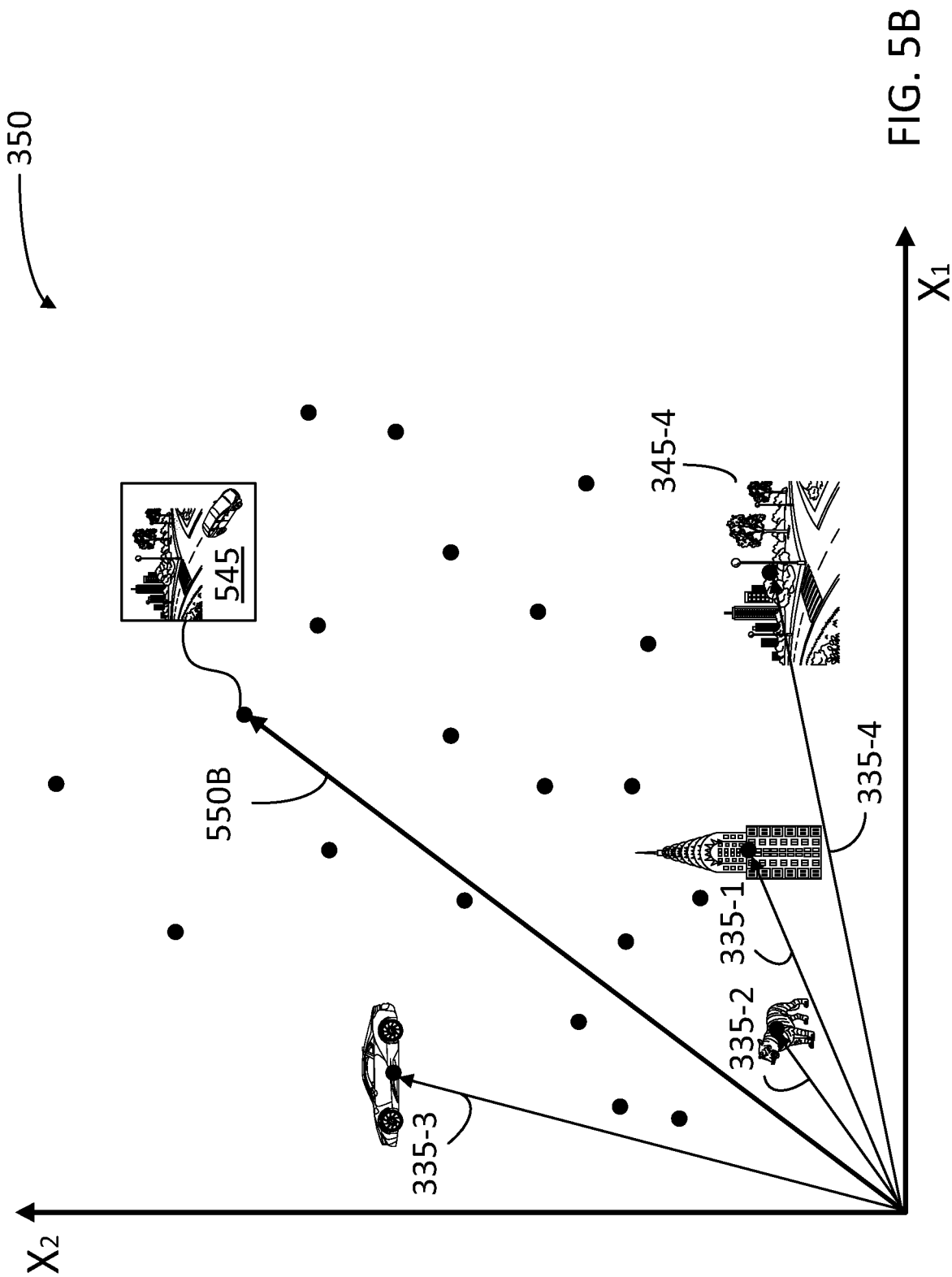

ated: blank for US 10,699,458 B2

IMAGE EDITOR FOR MERGING IMAGES WITH GENERATIVE ADVERSARIAL NETWORKS

BACKGROUND

Field

The present disclosure generally relates to image editing applications for users in graphic design. More specifically, the present disclosure relates to image editing applications that enable a user to select specific compositional constraints within a canvas to generate a desired image automatically.

Description of the Related Art

Current image editing applications may allow user input for conditionally generating images from a label, a scene graph, and a semantically segmented description. However, these configurations tend to demand constant user input and guidance during image creation, resulting in unrealistic images that are simply distinguishable as synthetic, even for the designer.

SUMMARY

In one embodiment of the present disclosure, a computer-implemented method is described for receiving a compositional constraint from a user for merging multiple images to create a canvas. The computer-implemented method includes finding a vector for the canvas in a merged space associated with the compositional constraint, and generating a synthetic image for the canvas based on the vector for the canvas and a generative tool trained in a generative adversarial configuration against a discriminative tool. The computer-implemented method also includes providing the synthetic image for the canvas to a user when the discriminative tool identifies the synthetic image as a real image.

In one embodiment of the present disclosure, a computer-implemented method is described for providing multiple images for merging in a canvas template provided by an application hosted by a server. The computer-implemented method also includes selecting a canvas composition from multiple options provided by the server, and modifying at least one of the images based on the canvas composition. The computer-implemented method also includes selecting a second canvas composition from a new set of options provided by the server.

According to one embodiment, a system is described that includes one or more processors and a memory coupled to the one or more processors, the memory including instructions that, when executed by the one or more processors, cause the one or more processors to receive a compositional constraint from a user for creating a canvas merging multiple images. The one or more processors execute instructions to find a vector for the canvas in a merged space associated with the compositional constraint, and to generate a synthetic image for the canvas based on the vector for the canvas and a generative tool trained in a generative adversarial configuration against a discriminative tool. The one or more processors also execute instructions to provide the synthetic image for the canvas to a user when the discriminative tool identifies the synthetic image as a real image.

According to one embodiment, a non-transitory, machine readable medium is described that includes instructions, which when executed by one or more processors, cause a computer to perform a method for receiving a compositional constraint from a user for merging multiple images to create a canvas. The method includes finding a vector for the canvas in a merged space associated with the compositional constraint, and generating a synthetic image for the canvas based on the vector for the canvas and a generative tool trained in a generative adversarial configuration against a discriminative tool. The method also includes providing the synthetic image for the canvas to a user when the discriminative tool identifies the synthetic image as a real image.

In yet other embodiment, a system is described that includes a means for storing commands and a means for executing the commands causing the system to perform a method that includes receiving a compositional constraint from a user for merging multiple images to create a canvas. The method includes finding a vector for the canvas in a merged space associated with the compositional constraint, and generating a synthetic image for the canvas based on the vector for the canvas and a generative tool trained in a generative adversarial configuration against a discriminative tool. The method also includes providing the synthetic image for the canvas to a user when the discriminative tool identifies the synthetic image as a real image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5B illustrates a single feature vector in the embedded space of FIG. 3, the single feature vector indicative of the synthetic image having a merged vector in the merged space from FIG. 5A, according to some embodiments.

In the figures, elements and steps denoted by the same or similar reference numerals are associated with the same or similar elements and steps, unless indicated otherwise.

DETAILED DESCRIPTION

Figure 1:
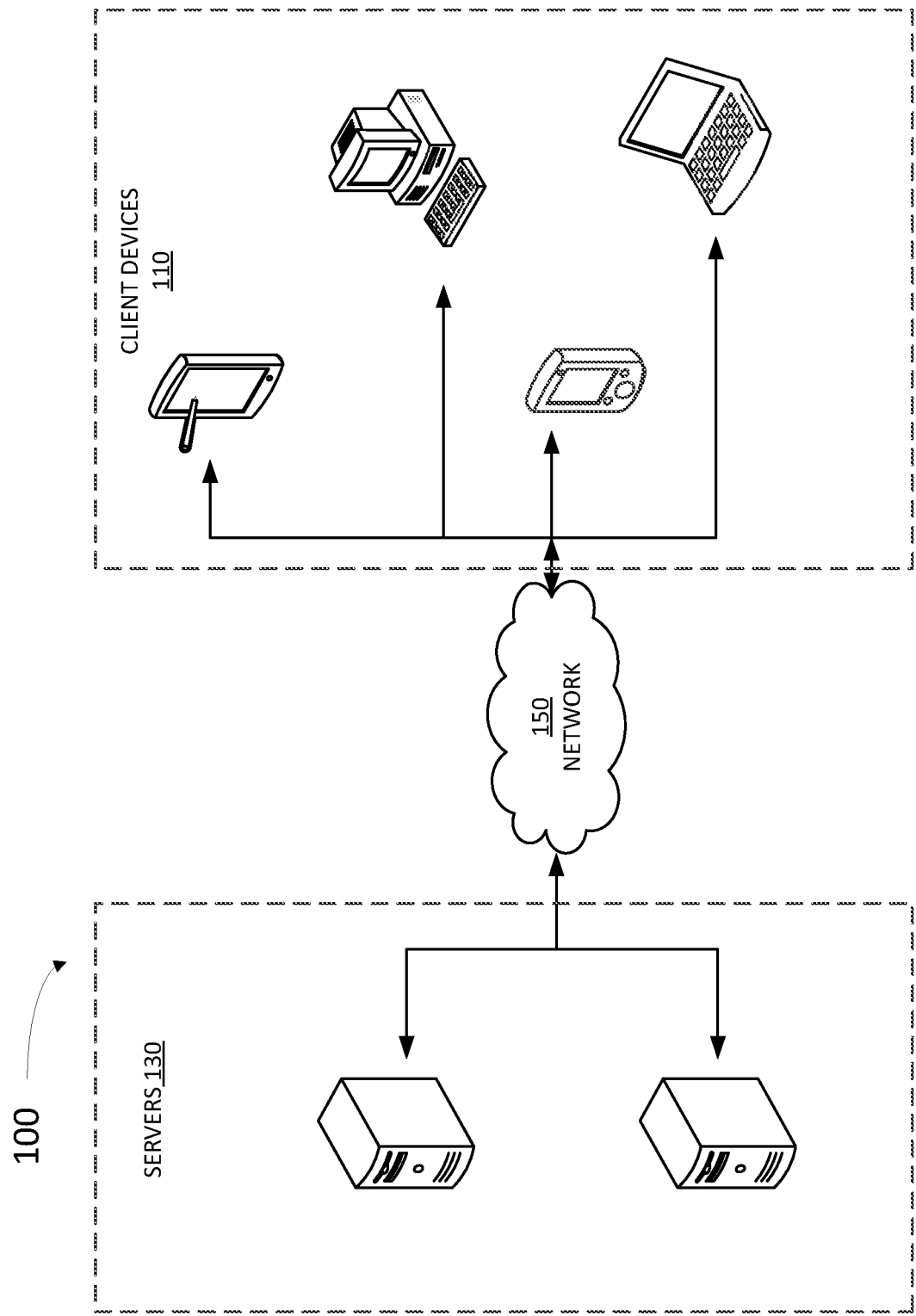
FIG. 1 illustrates an example architecture suitable for creating a canvas using image anchors, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a search query associated with an image for identifying the image.

The present disclosure relates to the creation of a canvas in which a user can specify any number of compositional constraints to be satisfied. Some of the compositional constraints include selected areas of the canvas where the user desires to place an image having certain properties or referring to a specific topic or content. The image creation process in embodiments consistent with the present disclosure is substantially automatic and seamless to the user (e.g., designer).

Some implementations provide a front-end portal that users can access remotely using a mobile device or a workstation. In some implementations, users may not desire to fully specify every detail of the image to be generated, but may desire to provide a few key concepts in the design. Accordingly, in some embodiments, it is desirable that the user input be reduced, and that the model would provide most of the composition and other details. Further, embodiments as disclosed herein provide realistic results with minimal input from the user to work out details and smooth out transitions in the canvas.

Some embodiments allow users to specify one or more image anchors as compositional constraints. In some embodiments, an image anchor is a combination of a position (e.g., within the canvas), and a concept associated to the specific topic or content that the user desires to allocate in the position. From the specified anchors, some embodiments generate a set of candidate images that conform to the compositional constraints using a generative tool. In some embodiments, the generative tool is trained in a generative adversarial network (GAN) engine, against a discriminative tool. In some embodiments, a compositional constraint is a fully specified client access server (CAS) query, while in some embodiments the compositional constraint may include a few keywords for the search engine.

More generally, embodiments as disclosed herein provide systems and methods to blend multiple real images into a single synthetic image using generative tools and positional constraints, wherein the synthetic image is close to or almost indistinguishable from a real image, to the human eye.

Embodiments as disclosed herein provide a solution to the problem arising in the realm of computer technology of providing a user-friendly platform to generate realistic images with limited user input other than basic, initial compositional constraints. To achieve this, some embodiments include a generative tool trained to create images that satisfy the compositional constraints from the user, and a discriminative tool, trained to identify images from the generative tool as synthetic, rather than realistic. The generative tool and the discriminative tool are trained against one another, thus resulting in an efficient tool for creating synthetic images that satisfy the compositional constraints from the user and are realistic.

The subject system provides several advantages, including a feature for selecting image anchors within a canvas, and for selecting size and shape of the image anchors. Moreover, in some embodiments, the user may input text queries within the image anchors, to indicate a more nuanced compositional constraint within the selected area of the canvas.

The proposed solution further provides improvements to the functioning of the computer itself because it reduces the burden on an image search engine for finding and processing requested images from the user. Rather, some embodiments as disclosed herein include a constrained generative adversarial network that accelerates the creation of realistic looking synthetic images to satisfy the user compositional constraints.

Example System Architecture

FIG. 1 illustrates an example architecture 100 for an image search engine suitable for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to create a new image from certain compositional constraints provided by the user of one of client devices 110. The compositional constraint may include the merging of two or more pre-selected images into a synthetic image that combines the context, meaning, and relative positioning of each of the component images. Accordingly, the processor may use a suitably trained generative tool to merge the component images into the synthetic image, and a discriminative tool to evaluate a synthetic detectability of the synthetic image (e.g., the resemblance of the synthetic image with a real image from the image database). For purposes of load balancing, multiple servers 130 can host memories including instructions to one or more processors, and multiple servers 130 can host a history log and the second image database.

Servers 130 may include any device having an appropriate processor, memory, and communications capability for hosting the generative tool, the discriminative tool, and a conditional generative adversary network (CGAN) engine hosing the tools. The CGAN engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
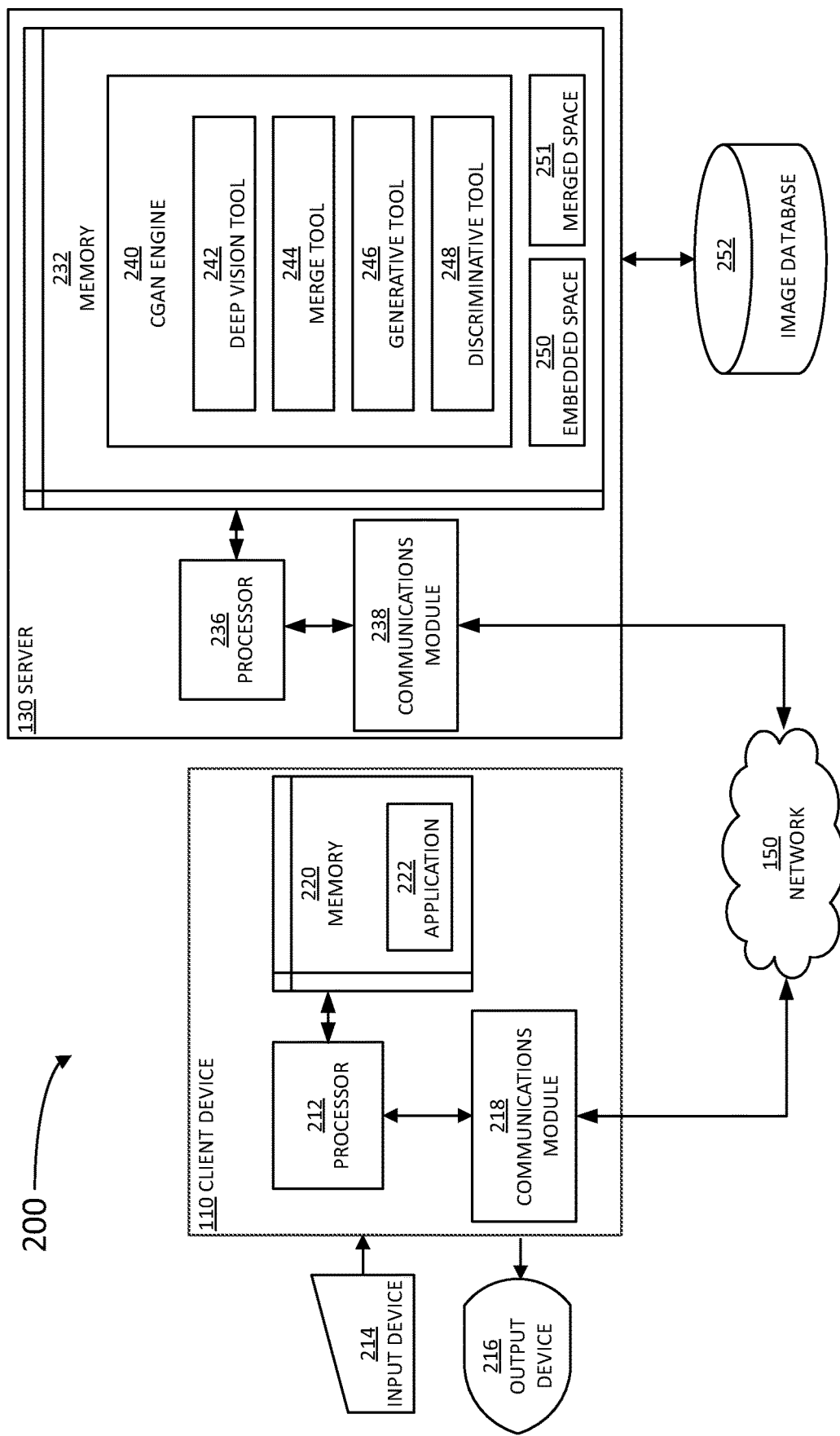
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. A user may interact with client device 110 via an input device 214 and an output device 216. Input device 214 may include a mouse, a keyboard, a pointer, a touchscreen, a microphone and the like. Output device may be a screen display, a touchscreen, a speaker, and the like.

Server 130 includes a memory 232, a processor 236, and a communications module 238. Processor 236 is configured to execute instructions, such as instructions physically coded into processor 236, instructions received from software in memory 232, or a combination of both. In some embodiments, memory 232 includes a conditional GAN (CGAN) engine 240. CGAN engine 240 may include a deep vision tool 242, a merge tool 244, a generative tool 246, and a discriminative tool 248. Deep vision tool 242 is a context embedder for associating images into an embedded vector space 250 based on context (e.g., a figure caption, textual reference, or semantic significance). In some embodiments, deep vision tool 242 cooperates with merge tool 244 to form a single, fixed length vector in a merged space 251. Vectors in merged space 251 may represent the compositional constraints selected by the user, such as a location within the canvas for selected images or themes.

Embedded space 250 is a multi-dimensional vector space wherein each dimension corresponds to a style class for an image. Accordingly, a vector projection over each dimension indicates, for a given image, a degree to which the image includes or represents said style class. A style class may be defined by an image caption, or some other textual description of a semantic concept that is useful to distinguish one image from another, or classify two images as visually similar. The quantification of the number and type of style classifications, and the projection of image vectors on each of the style classifications for any given image, may be performed by training a non-linear algorithm such as deep vision tool 242. The training of deep vision tool 242 is enhanced every time a user activates CGAN engine 240. In that regard, deep vision tool 242 maps variable sized images in the image database into image vectors in the embedded space, having a predetermined vector dimension. In some embodiments, deep vision tool 242 is trained to form an image vector in embedded space 250. Accordingly, deep vision tool 242 is configured to select a fixed-length subset of neural network activations such that there is a fixed mapping from images to the image vector in the embedded space (e.g., the fixed-length subset of tool activations has a length equal to the pre-selected vector dimension of the embedded space).

Merged space 251 is a multidimensional vector space including spatial dimensions (e.g., horizontal-X- and vertical-Y-directions) in addition to the style classification dimensions of embedded space 250. Merge tool 244 is configured to concatenate image vectors from embedded space 250 with spatial vectors in an X-Y plane and form a merged vector in merged space 251. The merged vector represents a canvas having multiple component images, wherein each of the component images is disposed according to the spatial coordinates, X-Y, on the canvas.

Generative tool 246 is configured to generate a plausible (e.g., 'realistic'), synthetic image given a compositional constraint (e.g., from a vector in embedded space 250) and a random seed. Discriminative tool 248 is configured to determine whether the synthetic image is real or not, and whether or not it matches the compositional constraint. In some embodiments, CGAN engine 240 includes a recurrent tool that receives as input, from the user of client device 110, a sequence of image anchors as compositional constraints. In some embodiments, an image anchor is a box within a canvas having a location, a shape and a size, and a pre-selected content. The pre-selected content may include a specific image, a text query, or a full description of a desired theme within the box. More specifically, in some embodiments, at least one of deep vision tool 242, merge tool 244, generative tool 246, or discriminative tool 248 include a neural network algorithm including multiple layers having nodes and coefficients associated to each node. The coefficients are determined based on a training set, wherein the gradients of the coefficients are weighted according to a desired outcome. Some embodiments include training discriminating tool 248 by applying the gradients to its coefficients based on losses (e.g., errors and failed assessments) resulting from real images with matching descriptions, from real images with invalid descriptions, and synthetic images (e.g., provided by generative tool 246). Accordingly, in some embodiments, discriminative tool 248 is configured to access image database 252 for training, and generative tool 246 is configured to provide synthetic images to image database 252.

The user may access CGAN engine 240 through an application 222 or a web browser installed in a memory 220 of client device 110. Accordingly, application 222 may be installed by server 130 and perform scripts and other routines provided by server 130. Execution of application 222 may be controlled by a processor 212 in client device 110. In some embodiments, CGAN engine 240, the tools contained therein, and at least part of image database 252 may be hosted in a different server that is accessible by server 130.

Figure 3:
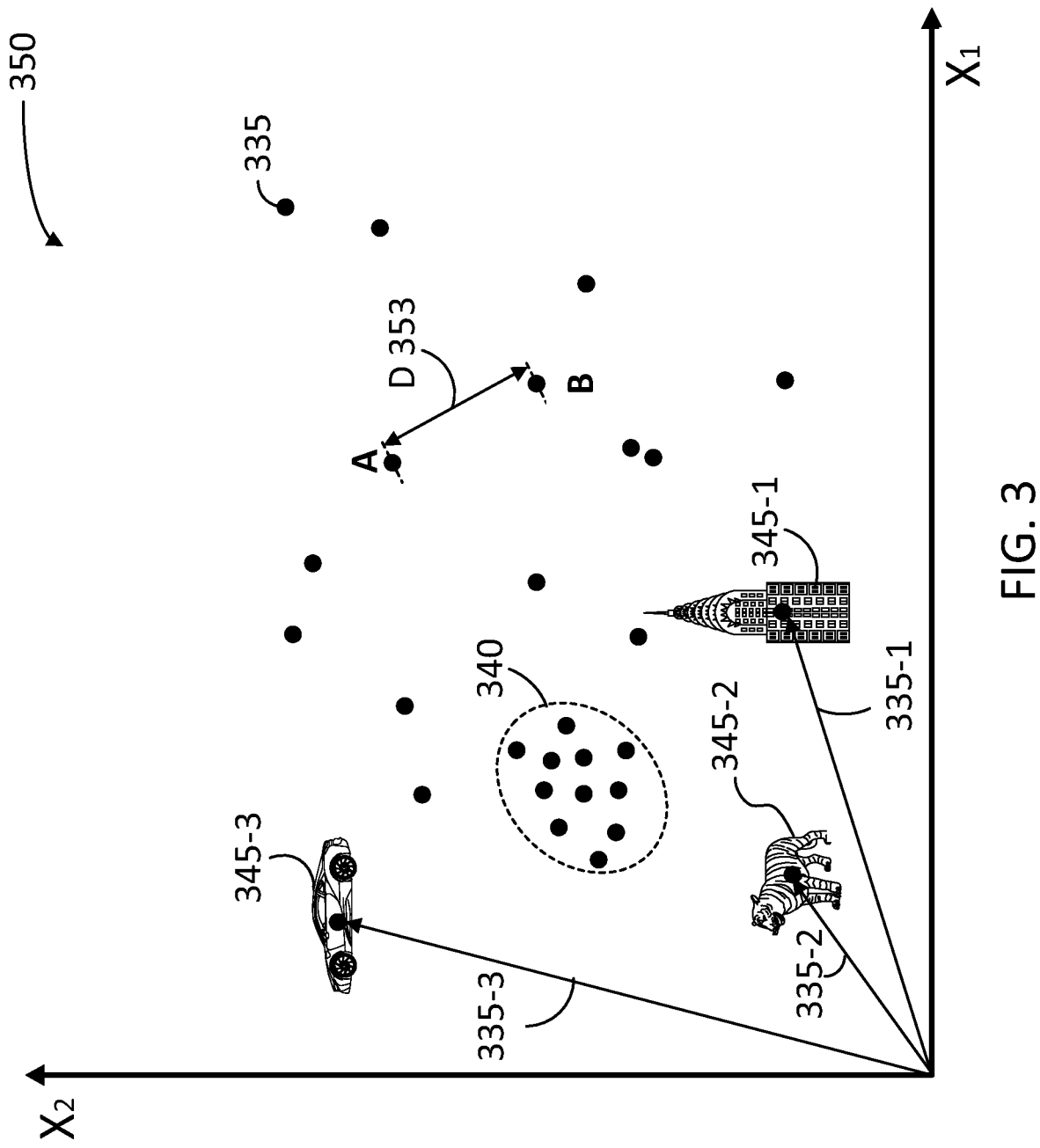
FIG. 3 illustrates an embedded space with image vectors for creating and merging images in a canvas using generative adversarial networks, according to some embodiments.

FIG. 3 illustrates an embedded space 350 with image vectors 335-1, 335-2, and 335-3 (hereinafter, collectively referred to as "image vectors 335"), according to some embodiments. Image vectors 335 are associated, respectively, to images 345-1, 345-2, and 345-3 (hereinafter, collectively referred to as "images 345"). Without limitation, and for illustrative purposes only, image 345-1 may be a high-rise building, characteristic of a city landscape. Image 345-2 may be a prowling tiger. And image 345-3 may be an automobile. For illustrative purposes, only the projection of embedded space 350 on two dimensions, $X_1$, in the abscissae and $X_2$, in the ordinates, are illustrated. Image vectors 335 may be associated with images in image database 252.

Embedded space 350 may be formed by deep vision tool 242 using image database 252. Further, embedded space 350 may be stored in memory 232 (e.g., embedded space 250), or may be external to memory 232 and directly or remotely accessible to CGAN engine 240 (e.g., image database 252). The values for $X_1$ and $X_2$, for each of image vectors 335, are selected according to merge tool 244. In some embodiments, deep vision tool 242 is configured so that vectors 335 associated with visually similar images are located, or "clustered," in close proximity to each other in embedded space 350, wherein a distance, D 353, between any two image vectors 335 ('A,' and 'B') may be defined as a "cosine" distance, D. In some embodiments, and without limitation, a cosine distance between two vectors, A, and B, regardless of the dimensions of the vectors, may be obtained from the mathematical expression $$D = 1 - \frac{A \cdot B}{|A||B|}, \tag{1}$$

where the "dot" product "•" may be suitably defined for the vector space that includes vectors A and B, and |A| and |B|, are generally "lengths" associated to vectors A and B, respectively, in the vector space.

Therefore, it is expected that image vectors 335 within a cluster 340 are visually similar to one another. Moreover, the closer the cosine distance D 353, the more visual similarity between two image vectors 335 is expected.

Figure 4:
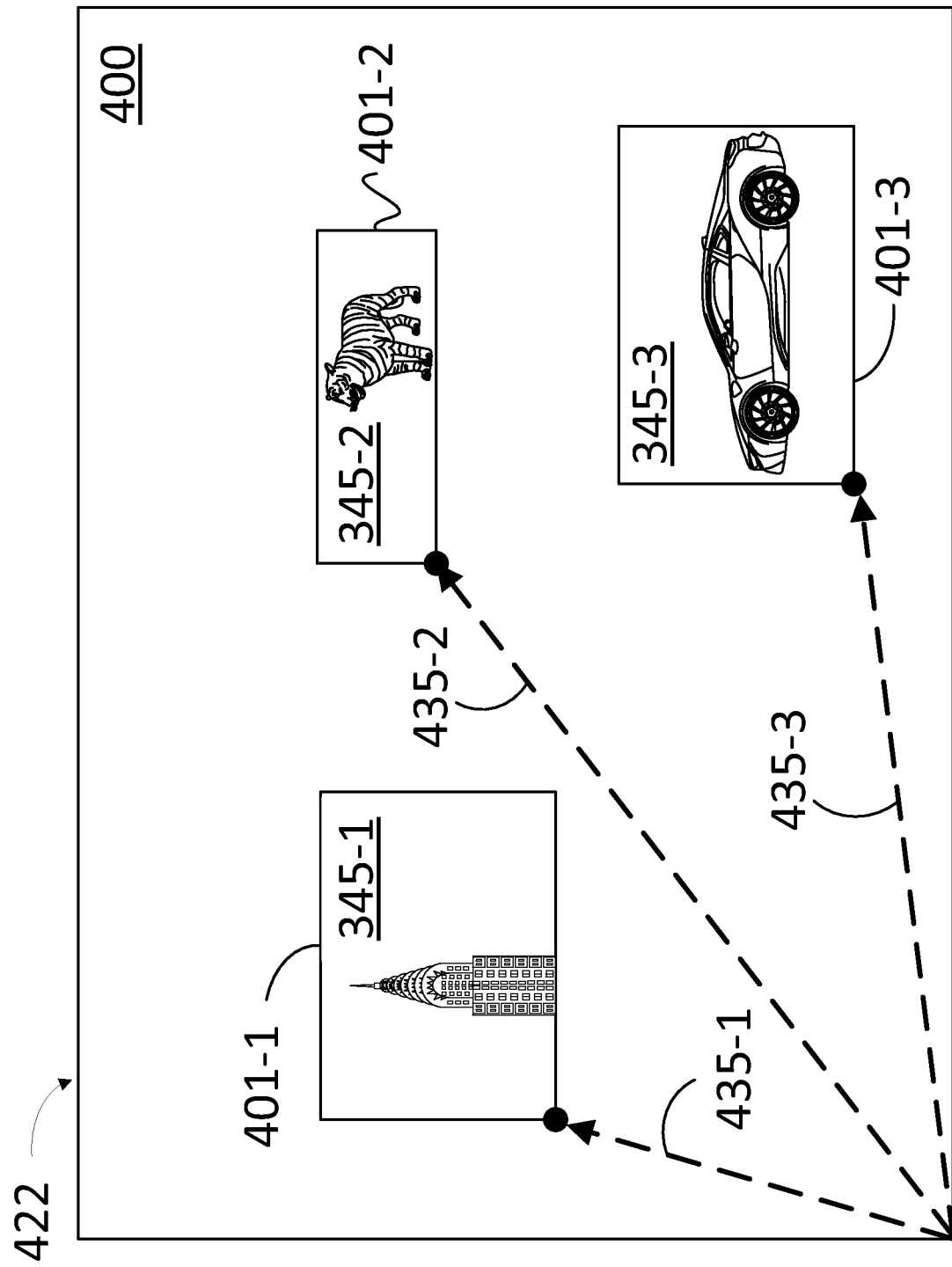
FIG. 4 illustrates a canvas in a composition template including multiple images having image anchors to place each of the images in a desired position, according to some embodiments.

FIG. 4 illustrates canvas 400 in an image-editing application 422, including images 345 having image anchors 401-1, 401-2, and 401-3 (hereinafter, collectively referred to as "image anchors 401") respectively, to place each of images 345-1, 345-2, and 345-3 (hereinafter, collectively referred to as "images 345") in a desired position within canvas 400, according to some embodiments. The position for each of images 345 within canvas 400 is defined by position vectors 435-1, 435-2, and 435-3 (hereinafter, collectively referred to as "position vectors 435"), respectively.

In some embodiments, image-editing application 422 is installed in a client device for the user, and is remotely hosted by a server (e.g., client device 110, application 222, and server 130). Image-editing application 422 provides a user-friendly, front-end experience. In this case, instead of fully specifying every detail of the image to be generated in canvas 400, the user instead may simply incorporate a few key concepts within image anchors 401. A CGAN engine (e.g., CGAN engine 240) provides a canvas including the compositional constraints within image anchors 401 and position vectors 435. The resulting image for canvas 400 is desirably a realistic image.

Figure 5A:
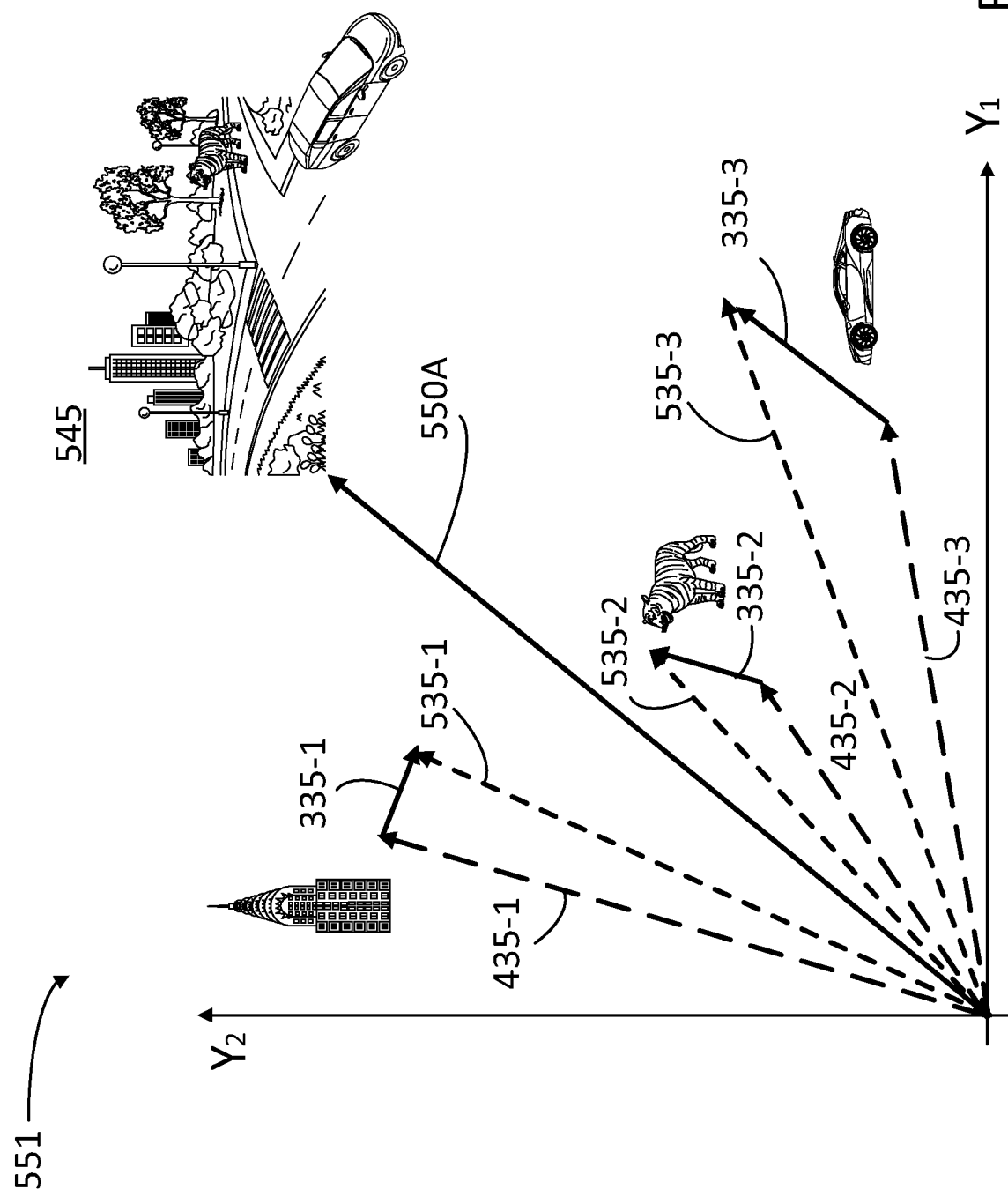
FIG. 5A illustrates a merged space including coordinates from the embedded space in FIG. 3 and positioning coordinates associated with the image anchors in FIG. 4, according to some embodiments.

FIG. 5A illustrates a merged space 551 (cf. merged space 251) including coordinates $Y_1$ and $Y_2$. Coordinates $Y_1$ and $Y_2$ include $X_1$ and $X_2$ from embedded space 350 and positioning coordinates associated with position vectors 435 (435-1, 435-2, and 435-3), according to some embodiments. For each of the compositional constraints in image anchors 401, merged space 551 includes merged vectors 535-1, 535-2, and 535-3 (hereinafter, collectively referred to as "merged vectors 535"). Each of merged vectors 535 is a concatenation of each position vector 435 with the corresponding embedded vector 335 (335-1, 335-2, and 335-3). Accordingly, merged vector 535-1 represents a high-rise building located in the upper left corner of the canvas. Merged vector 535-2 represents a prowling tiger located in the upper right corner of the canvas. And merged vector 535-3 represents a car moving along the lower right corner of the canvas.

In some embodiments, the generative tool in a CGAN engine (e.g., CGAN engine 240) may combine merged vectors 535 into a single vector 550A in merged vector space 551, which represents a canvas with an image that contains the elements associated with each of merged vectors 535. For example, vector 550A may be associated with a synthetic image 545, including a city landscape having a high-rise building, and a prowling tiger coming upon a street corner with a sports car coming up around the corner.

FIG. 5B illustrates a single feature vector 550B in embedded space 350 (with coordinates $X_1$ and $X_2$). Single feature vector 550B is indicative of synthetic image 545 having vector 550A in merged space 551, according to some embodiments. A vector 335-4 associated with the background image 345-4 of city landscape is also illustrated. Note that vectors 335 associated with images 345 may be elsewhere in embedded space 350.

Note that synthetic image 545 may be new in embedded space 350. Accordingly, in some embodiments, the generative tool creates a new image that was non-existent previously, in image database 252. Accordingly, some embodiments address potential gaps in image database 252, especially in cases of a 'surrealist' type endeavor, such as a Bengal tiger freely walking the streets of NYC (e.g., image 345-4). In less extreme cases, embodiments consistent with the present disclosure may allow a user to slightly tweak a compositional element in a 'real' image from the image database, to obtain a synthetic image that better aligns with a design objective.

Figure 6:
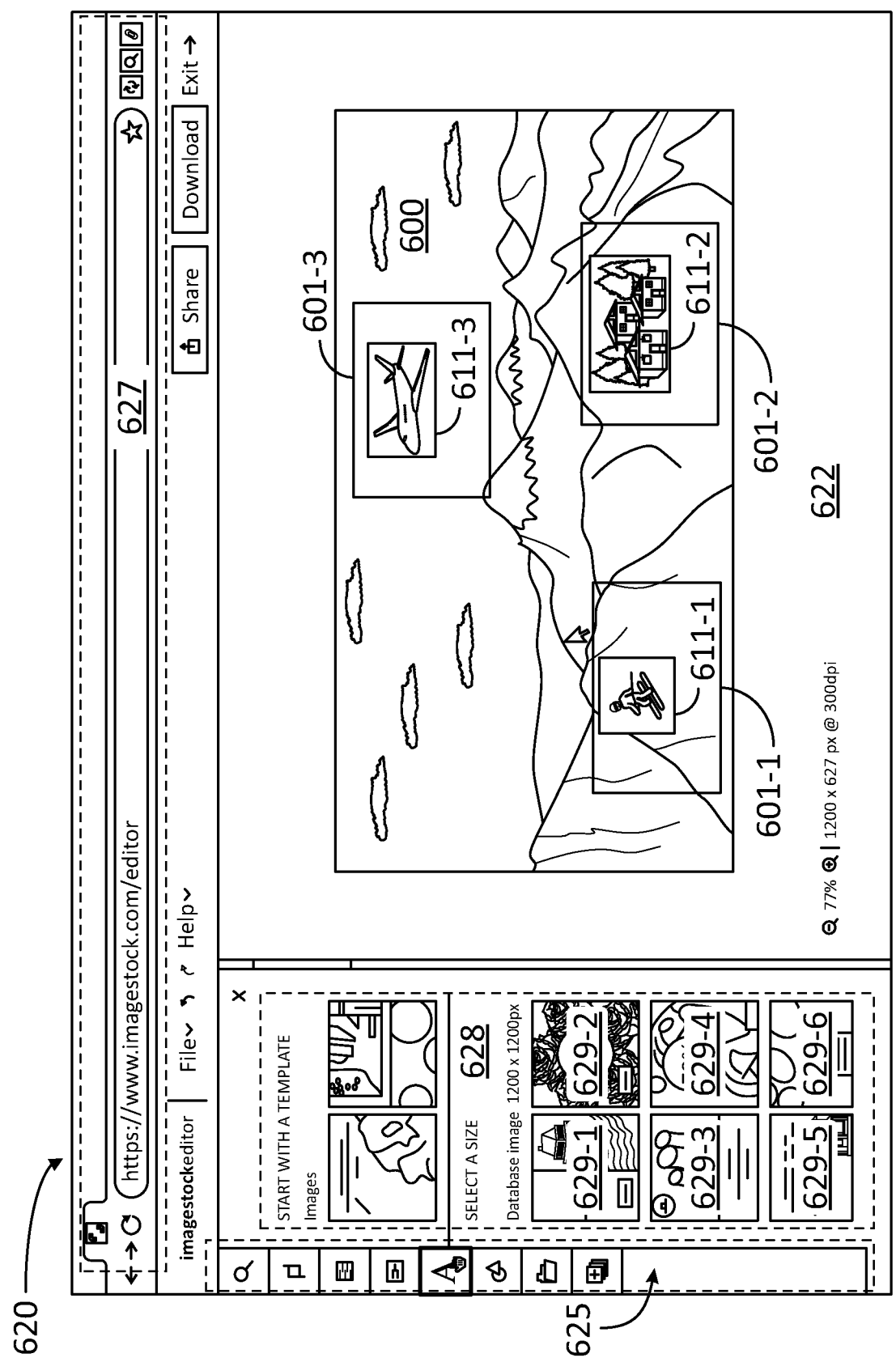
FIG. 6 illustrates a screen shot of a web page of an editing tool configured for creating an image using image anchors, according to some embodiments.

FIG. 6 illustrates a screen shot 620 of a web page 627 of an image-editing application 622 configured for creating an image using image anchors 601-1, 601-2, and 601-3 (hereinafter, collectively referred to as "image anchors 601"), according to some embodiments. In some embodiments, image-editing application 622 is installed in a client device for the user, and is remotely hosted by a server (e.g., client device 110, application 222, and server 130). In some embodiments, image-editing application 622 allows users to generate images "on the fly" that adhere to a specified set of compositional constraints. In effect, web page 627 provides a "Composition Aware Search" user experience, which includes a generative tool to create new images that match the constraints in image anchors 601, within a canvas 600.

In some embodiments, image-editing application 622 invokes a CAS-like synthetic image merging routine to allow the user to merge one or more real images 611-1, 611-2, and 611-3 (hereinafter, collectively referred to as "real images 611") from a given collection, e.g., image database 252 (e.g., three images: skier, alpine chalet, and airplane). The synthetic image merging routine also allows the user to specify a positional constraint for each image, and use a generative tool to create an image that merges the salient constructs from each of the source images into a believable synthetic image: an alpine landscape with a skier, a chalet, and an airplane in the sky (e.g., for a canvas advertising a travel service).

This is precisely how this embodiment would work, because users would simply specify the key concepts (a set of position-concept tuples). It would enable users to specify important parts of the desired image much more quickly than semantic labeling, and is able to be much more precise than providing a natural language description.

Each of image anchors 601 may have a different size and shape. For example, the user might want 'airplane' 611-3 to fly over the sky, 'skier' 611-1 gliding on a southern mountain, and a 'chalet' 611-2 on a northern slope of another mountain, wherein the mountains and the sky may have been previously selected by the user as a background image. Using a pointer (e.g., a mouse or any other pointing device, cf. input device 214), the user may be able to interact with the canvas to manually create and position each of real images 611. Moreover, in some embodiments, the user may be allowed to search in the image database for a specific image to be placed in a given anchor, using a query for a search engine. Images 629-1, 629-2, 629-3, 629-4, 629-5, and 629-6 (hereinafter, collectively referred to as "images 629") are provided by the search engine on a panel 628, from which the user may select one to be placed in the respective one of image anchors 601. A tool bar 625 enables the user to perform other manipulation of objects within canvas 600.

Figure 7:
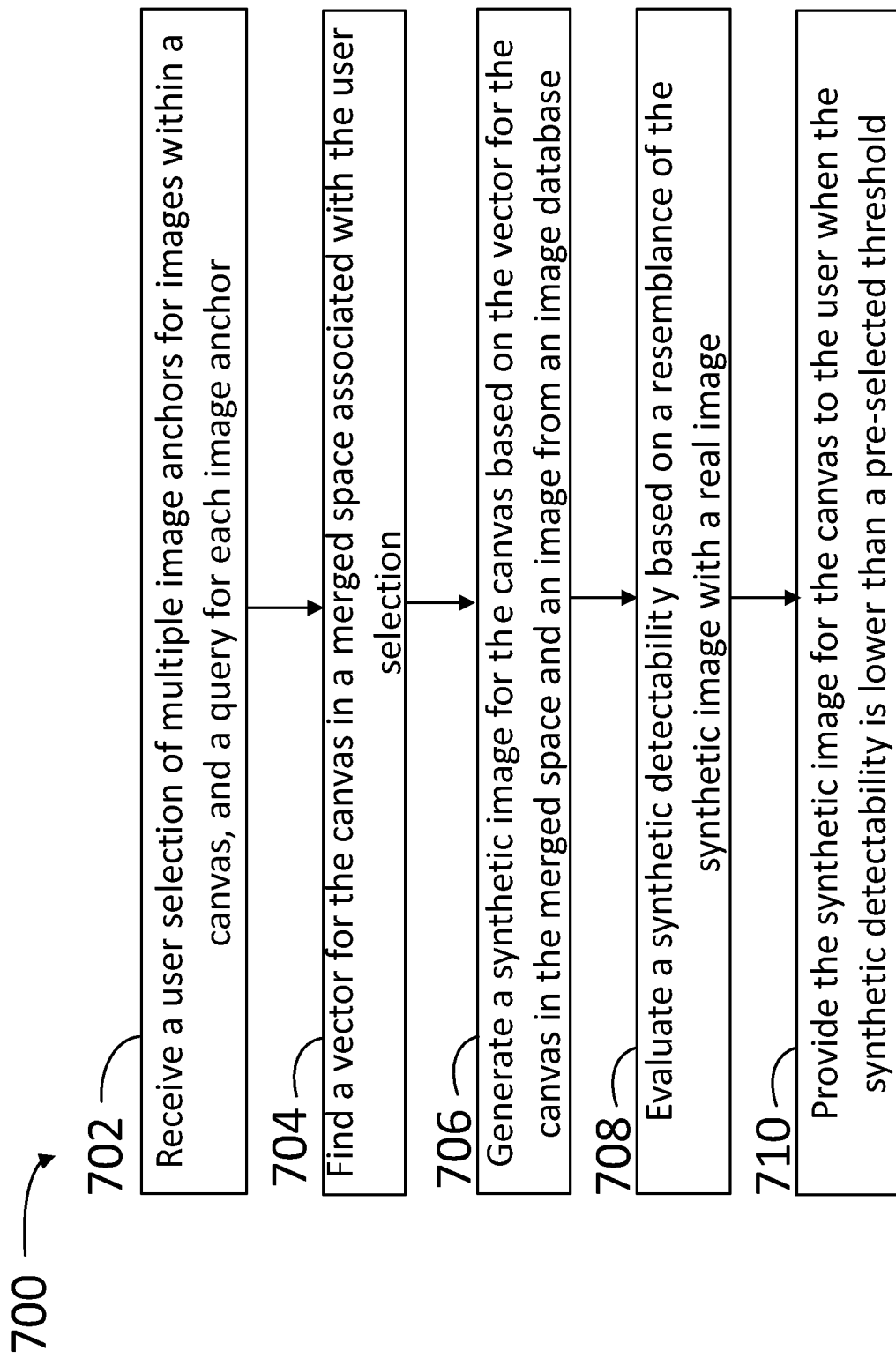
FIG. 7 is a flow chart illustrating steps in a method for generating an image that matches a user constraint, according to some embodiments.

FIG. 7 is a flow chart illustrating steps in a method 700 for generating an image that matches a user constraint, according to some embodiments. Method 700 may be performed at least partially by any one of servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222, 422, and 622). At least some of the steps in method 700 may be performed by a computer having a processor executing commands stored in a memory of the computer (e.g., processors 212 and 236 and memory 232). Further, steps as disclosed in method 700 may include retrieving, editing, and/or storing files in an image database that is part of, or is communicably coupled to, the computer, using, inter-alia, a CGAN engine (e.g., image database 252 and CGAN engine 240). The CGAN engine may include a deep vision tool to embed images into an embedded space, a merge tool to transfer images between the embedded space and a merged space, a generative tool to form synthetic images from merged vectors, and a discriminative tool to determine how realistic a synthetic image is (e.g., deep vision tool 242, merge tool 244, generative tool 246, discriminative tool 248, embedded spaces 250 and 350, and merged spaces 251 and 351). The merged space may include dimensions associated with image context, and dimensions associated with image location within a canvas. Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes receiving a user selection of multiple image anchors for images within a canvas, and a query for each image anchor. In some embodiments, step 702 may include receiving key terms from the user in the query for each image anchor. Additionally, in some embodiments, step 702 includes receiving user-selected images from the image database (via a search interface, or add-to-generation type cart interface) in the query for each image anchor. In some embodiments, step 702 includes searching, using a search engine on a database, the images for each image anchor, based on the query for each image anchor, and providing the search results for each image anchor to the user. In some embodiments, step 702 includes receiving at least two tuples, each tuple comprising a position within the canvas and a context associated with the position within the canvas. In some embodiments, step 702 includes receiving, in a client access server, a fully specified query for an image. In some embodiments, step 702 includes receiving an image selected from an image database, the image being anchored on a pre-selected location of the canvas, and having a pre-selected size and a pre-selected boundary shape.

Step 704 includes finding a vector for the canvas in a merged space associated with the user selection.

Step 706 includes generating a synthetic image for the canvas based on the vector for the canvas. In some embodiments, step 704 includes evaluating the resemblance of the synthetic image with a real image in the database. For example, in some embodiments, step 704 includes determining a cosine distance between a vector for the synthetic image and a closest vector for an image from the database, in an embedded space. In some embodiments, step 706 includes finding, with a deep vision tool, a vector for each image anchor in an embedded vector space based on a context. In some embodiments, step 706 includes adding a random seed in the vector for the canvas in the merged space to form a seeded vector, and feeding the seeded vector into a generative tool configured to generate a plausible image from the seeded vector. In some embodiments, step 706 includes finding, with a discriminative tool, a distance between the vector for the canvas in the merged space and a vector for the real image, in the merged space. In some embodiments, step 706 includes determining a loss factor by comparing a context of a portion of the image in the canvas at a specified location with a specified context for an image anchor associated with the specified location.

Step 708 includes evaluating a synthetic detectability based on a resemblance of the synthetic image with a real image.

Step 710 includes providing the synthetic image for the canvas to the user when the synthetic detectability is lower than a pre-selected threshold. In some embodiments, step 710 includes alternatively training a discriminative tool with real images in the image database having matching descriptions, with real images in the image database having invalid descriptions, and previously generated images in the image database. In some embodiments, step 710 includes feeding back the vector to verify that an image location includes an image context as specified in one of the image anchors.

Figure 8:
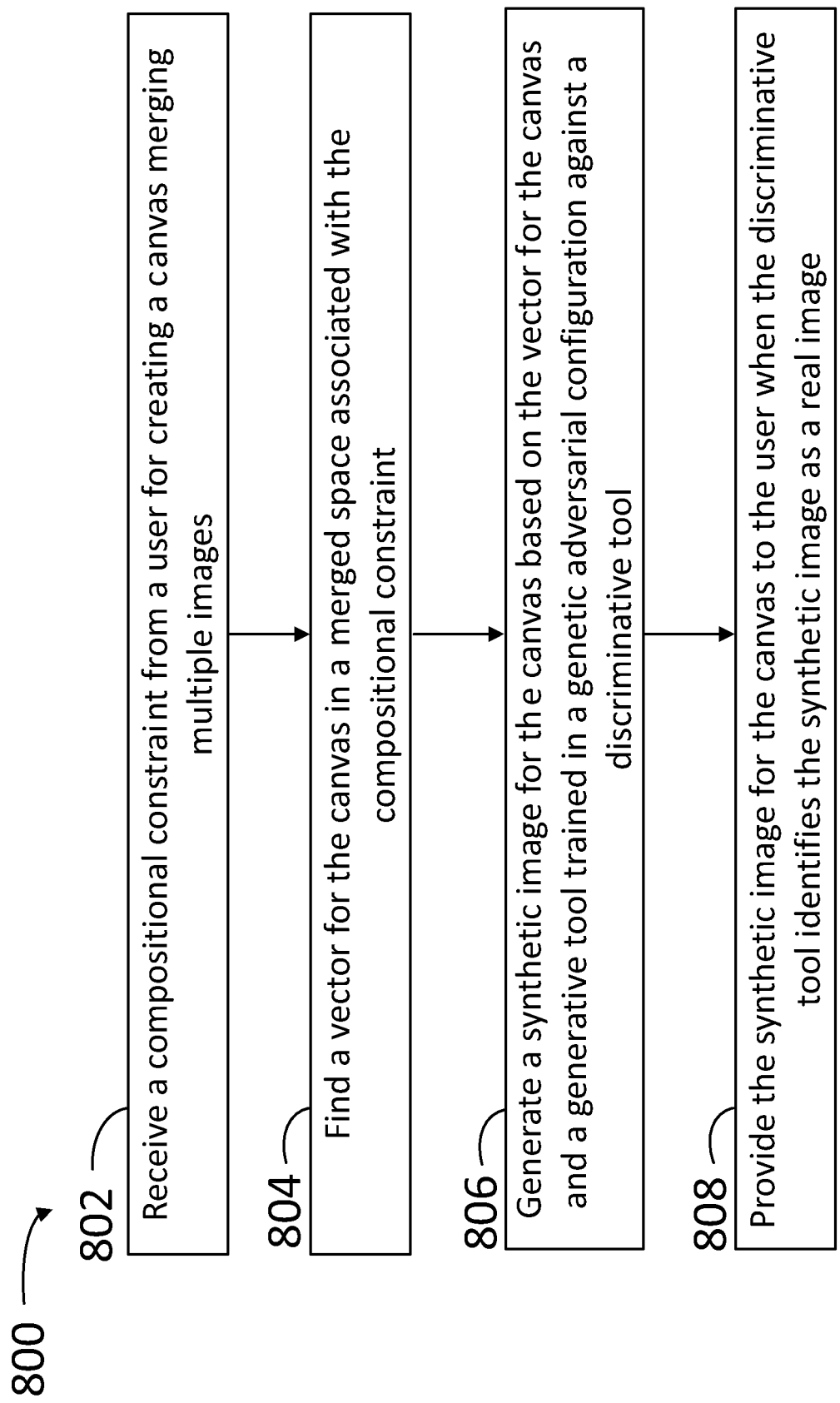
FIG. 8 is a flow chart illustrating steps in a method for creating images using compositional constraints and generative adversarial neural networks, according to some embodiments.

FIG. 8 is a flow chart illustrating steps in a method 800 for creating images using compositional constraints and generative adversarial neural networks, according to some embodiments. Method 800 may be performed at least partially by any one of servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222, 422, and 622). At least some of the steps in method 800 may be performed by a computer having a processor executing commands stored in a memory of the computer (e.g., processors 212 and 236, and memory 232). Further, steps as disclosed in method 800 may include retrieving, editing, and/or storing files in an image database that is part of, or is communicably coupled to, the computer, using, inter-alia, a CGAN engine (e.g., image database 252 and CGAN engine 240). The CGAN engine may include a deep vision tool to embed images into an embedded space, a merge tool to transfer images between the embedded space and a merged space, a generative tool to form synthetic images from merged vectors, and a discriminative tool to determine how realistic a synthetic image is (e.g., deep vision tool 242, merge tool 244, generative tool 246, discriminative tool 248, embedded spaces 250 and 350, and merged spaces 251 and 551). The merged space may include dimensions associated with image context, and dimensions associated with image location within a canvas. Methods consistent with the present disclosure may include at least some, but not all, of the steps illustrated in method 800, performed in a different sequence. Furthermore, methods consistent with the present disclosure may include at least two or more steps as in method 800 performed overlapping in time, or almost simultaneously.

Step 802 includes receiving a compositional constraint from a user for merging multiple images to create a canvas. In some embodiments, step 802 includes receiving a positional constraint within the canvas for at least one of the images.

Step 804 includes finding a vector for the canvas in a merged space associated with the compositional constraint.

Step 806 includes generating a synthetic image for the canvas based on the vector for the canvas and a generative tool trained in a generative adversarial configuration against a discriminative tool. In some embodiments, step 806 includes relaxing a positional condition for at least two images within the canvas. In some embodiments, step 806 includes merging a first saliency measure for a first image in the canvas with a second saliency measure for a second image in the canvas to form a compound saliency measure associated with the vector for the canvas in the merged space. In some embodiments, step 806 includes generating, in an embedded vector space, a single feature vector based on multiple positional feature vectors for each of the images in the merged space. In some embodiments, step 806 includes obtaining a loss factor from the discriminative tool with the vector for the canvas in the merged space, and modifying the vector for the canvas in the merged space when the loss factor is greater than a selected threshold. In some embodiments, step 806 includes subtracting a spatial feature vector from the vector for the canvas in the merged space to obtain a residual vector, and determining a loss factor using a deep vision tool based on a context of the residual vector.

Step 808 includes providing the synthetic image for the canvas to the user when the discriminative tool identifies the synthetic image as a real image. In some embodiments, step 808 includes associating the synthetic image with a synthetic label and storing the synthetic image and the synthetic label in an image database for training the discriminative tool. In some embodiments, step 808 includes modifying a coefficient of the generative tool when the discriminative tool recognizes the synthetic image as synthetic. In some embodiments, step 808 includes modifying a coefficient of the discriminative tool to recognize the synthetic image as synthetic.

Figure 9:
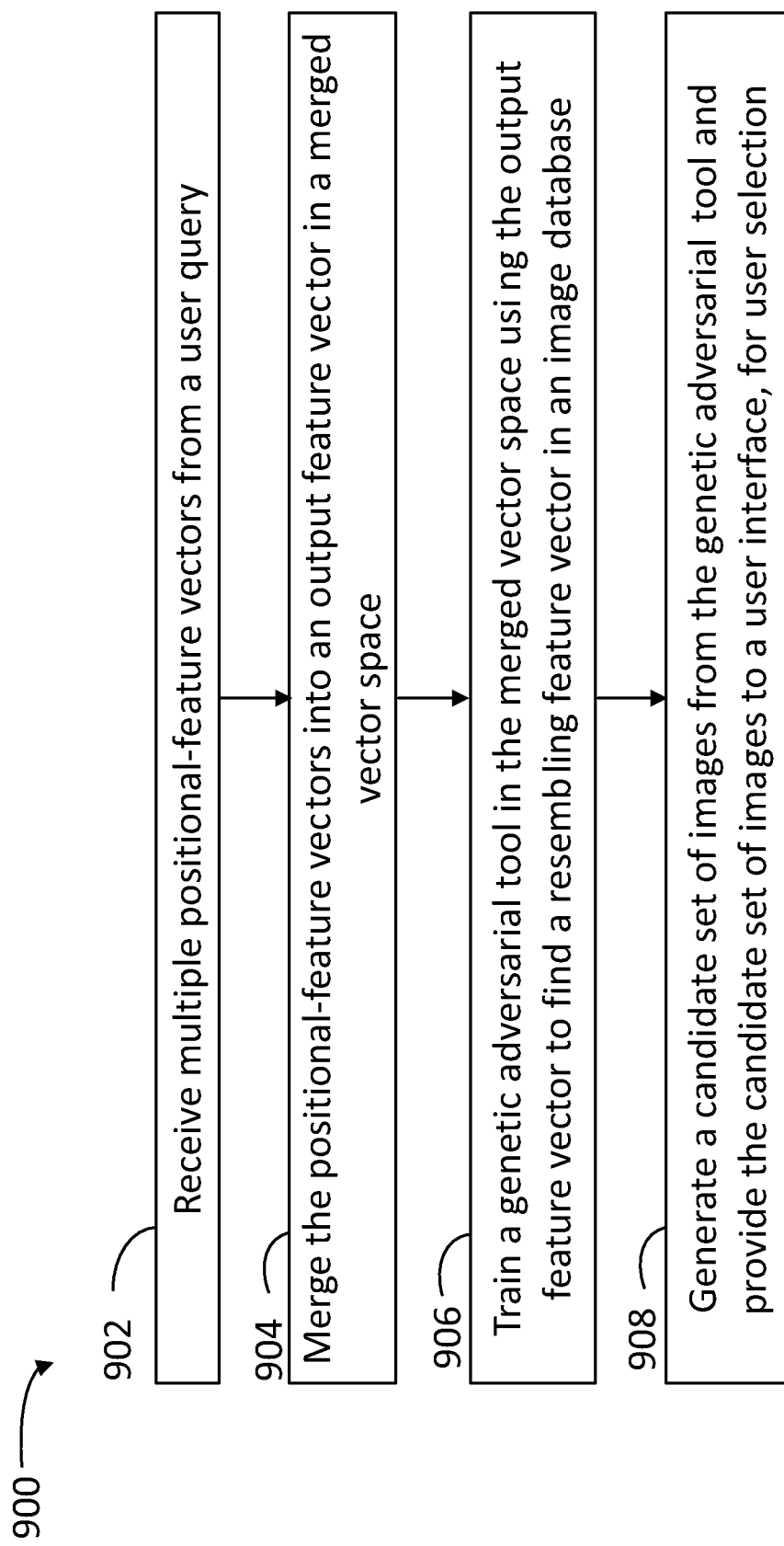
FIG. 9 is a flow chart illustrating steps in a method for combining losses and using a backprop scheme, according to some embodiments.

FIG. 9 is a flow chart illustrating steps in a method 900 for creating images using image anchors and generative adversarial neural networks, according to some embodiments. Method 900 may be performed at least partially by any one of servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222, 422, and 622). At least some of the steps in method 900 may be performed by a computer having a processor executing commands stored in a memory of the computer (e.g., processors 212 and 236, and memory 232). Further, steps as disclosed in method 900 may include retrieving, editing, and/or storing files in an image database that is part of, or is communicably coupled to, the computer, using, inter-alia, a CGAN engine (e.g., image database 252 and CGAN engine 240). The CGAN engine may include a deep vision tool to embed images into an embedded space, a merge tool to transfer images between the embedded space and a merged space, a generative tool to form synthetic images from merged vectors, and a discriminative tool to determine how realistic a synthetic image is (e.g., deep vision tool 242, merge tool 244, generative tool 246, discriminative tool 248, embedded spaces 250 and 350, and merged spaces 251 and 551). The merged space may include dimensions associated with image context, and dimensions associated with image location within a canvas. Methods consistent with the present disclosure may include at least some, but not all, of the steps illustrated in method 900, performed in a different sequence. Furthermore, methods consistent with the present disclosure may include at least two or more steps as in method 900 performed overlapping in time, or almost simultaneously.

Step 902 includes receiving multiple positional-feature vectors (e.g., from 1 to k positional-feature vectors) from a user query. In some embodiments, the positional-feature vectors are associated with image anchors for images within a canvas, and step 902 may include receiving the image anchors from the user. Further, step 902 may include receiving desired images from the user at each of the desired positions for the image anchors within the canvas.

Step 904 includes merging the positional-feature vectors into an output feature vector in a merged vector space. The output feature vector is indicative of a canvas image including images similar to each of the desired images at the desired positions in the canvas, according to the positional-feature vectors.

Step 906 includes training a generative adversarial tool in the merged vector space using the output feature vector to find a resembling feature vector in the image database that is within a desired cosine distance from the output feature vector. In some embodiments, the resembling feature vector may be a 'true' image, in the sense of an image having a single source associated with an image capturing device, such as a camera, a video grabber, and the like. In some embodiments, step 906 includes splitting a neural network associated with the merged vector space into a generator tool and a discriminative tool. The generator tool is trained to generate synthetic vectors in the embedded vector space. The discriminator tool is trained to identify, for any given image, whether the image is related to a 'real' source image (e.g., to a single image capturing device). Accordingly, in some embodiments, step 906 includes alternating the generative tool with the discriminative tool to obtain synthetic vectors that resemble more and more a given 'real' source image. For example, in some embodiments, step 906 includes determining a synthetic to real distance indicative of how close the synthetic image is from a 'real' source image. Further, step 906 may include modifying the coefficients in the generative tool with the goal of minimizing the synthetic to real distance. In some embodiments, step 906 may include modifying the coefficients in the discriminative tool with the goal of reducing the discriminator resolution distance below the synthetic to real distance. In some embodiments, step 906 may include executing a conditional generative tool by training a discriminative tool against a general deep vision tool in the generative tool. Accordingly, step 906 may include training the discriminative tool to reduce false positives (e.g., reducing the discriminator resolution distance to avoid a synthetic image being labeled as 'real'), and maximize the probability of true positives (e.g., a 'real' image labeled as 'real,' as expected). In some embodiments, step 906 may include additional training of the deep vision tool in the generator tool using explicit saliency support using the gradients of the tool coefficients.

Step 908 includes generating a candidate set of images from the trained model, and returning the candidate set of images to the user interface, for user selection. In some embodiments, step 908 includes iterating multiple loops combining losses in a back-propagation scheme to train the deep vision tool to generate the candidate set of images.

Figure 10:
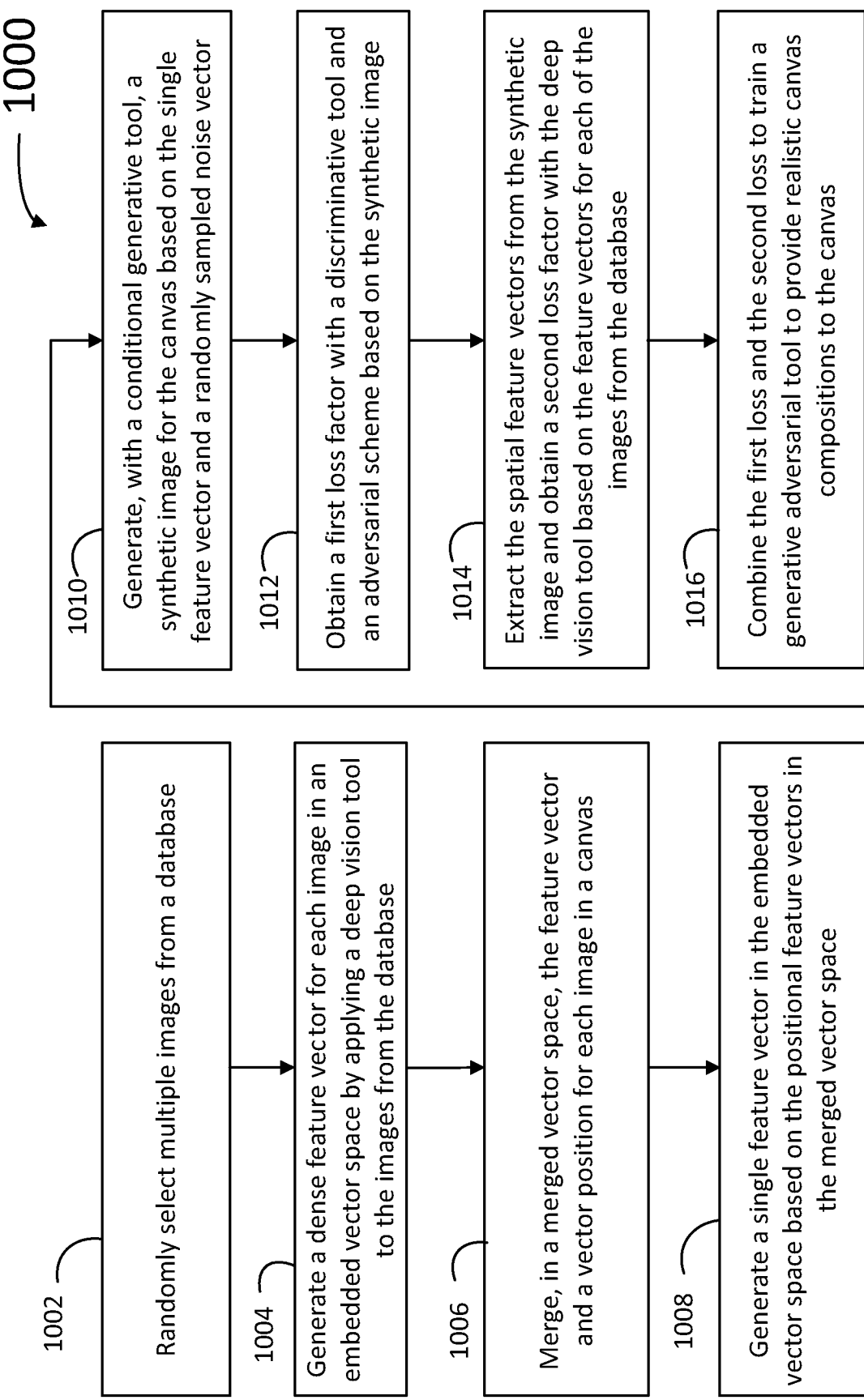
FIG. 10 is a flow chart illustrating steps in a method for combining losses and using a backprop scheme, according to some embodiments.

FIG. 10 is a flow chart illustrating steps in a method 1000 for combining losses and using a backprop scheme, according to some embodiments. Method 1000 may be performed at least partially by any one of servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222, 422, and 622). At least some of the steps in method 1000 may be performed by a computer having a processor executing commands stored in a memory of the computer (e.g., processors 212 and 236, and memory 232). Further, steps as disclosed in method 1000 may include retrieving, editing, and/or storing files in an image database that is part of, or is communicably coupled to, the computer, using, inter-alia, a CGAN engine (e.g., image database 252 and CGAN engine 240). The CGAN engine may include a deep vision tool to embed images into an embedded space, a merge tool to transfer images between the embedded space and a merged space, a generative tool to form synthetic images from merged vectors, and a discriminative tool to determine how realistic a synthetic image is (e.g., deep vision tool 242, merge tool 244, generative tool 246, discriminative tool 248, embedded spaces 250 and 350, and merged spaces 251 and 551). The merged space may include dimensions associated with image context, and dimensions associated with image location within a canvas. Methods consistent with the present disclosure may include at least some, but not all, of the steps illustrated in method 1000, performed in a different sequence. Furthermore, methods consistent with the present disclosure may include at least two or more steps as in method 1000 performed overlapping in time, or almost simultaneously.

Step 1002 includes randomly selecting multiple images from the database. In some embodiments, step 1002 also includes selecting a random position for each image.

Step 1004 includes generating a dense feature vector for each image in an embedded vector space by applying a deep vision tool to the images from the database. In some embodiments, step 1004 includes feeding the images through a first tool (e.g., a general deep vision tool with explicit saliency support) to generate a dense feature vector description of each image in the embedded vector space.

Step 1006 includes merging, in a merged vector space, the feature vector and the vector position for each image in a canvas. In some embodiments, step 1006 includes concatenating a normalized position of each image to the feature vector for each of the images to create the positional-feature vector in a merged vector space.

Step 1008 includes generating a single feature vector in the embedded vector space based on the positional feature vectors in the merged vector space. In some embodiments, step 1008 includes feeding all of the positional feature vectors through a second tool (e.g., merge tool) to generate a single feature vector in a merged vector space.

Step 1010 includes generating, with a conditional generative tool, a synthetic image for the canvas based on the single feature vector and a randomly sampled noise vector. In some embodiments, step 1010 includes feeding the single feature vector, along with a randomly sampled noise vector, through a third tool (e.g., conditional generative tool) to generate the proposed synthetic image.

Step 1012 includes obtaining a first loss factor with a discriminative tool and an adversarial scheme based on the synthetic image. In some embodiments, step 1012 includes generating a first loss by feeding the synthetic image through the discrimination network, using an adversarial loss (e.g., Wasserstein).

Step 1014 includes extracting the spatial feature vectors from the synthetic image and obtaining a second loss factor with the deep vision tool, based on the feature vectors for each of the images from the database. In some embodiments, step 1014 includes determining the cosine distance of a synthetic image vector with the feature vectors for each of the images from the database (cf. step 1004) when the spatial vectors have been subtracted from the synthetic image vector. In some embodiments, step 1014 includes feeding the synthetic image to the deep vision tool and extracting the spatial feature vectors from the tool from before the saliency function. Accordingly, step 1014 may include correlating spatial feature vectors from the tool with the positions of the input images. We expect these vectors to be similar, since they should be representing the given concept.

Step 1016 includes combining the first loss and the second loss to train the generative adversarial tool to provide realistic canvas compositions to the canvas based on user inputs, including images tied to image anchors. In some embodiments, step 1016 includes back propagating the gradients of the discriminative tool and the generative tool with the first loss and the second loss.

Figure 11:
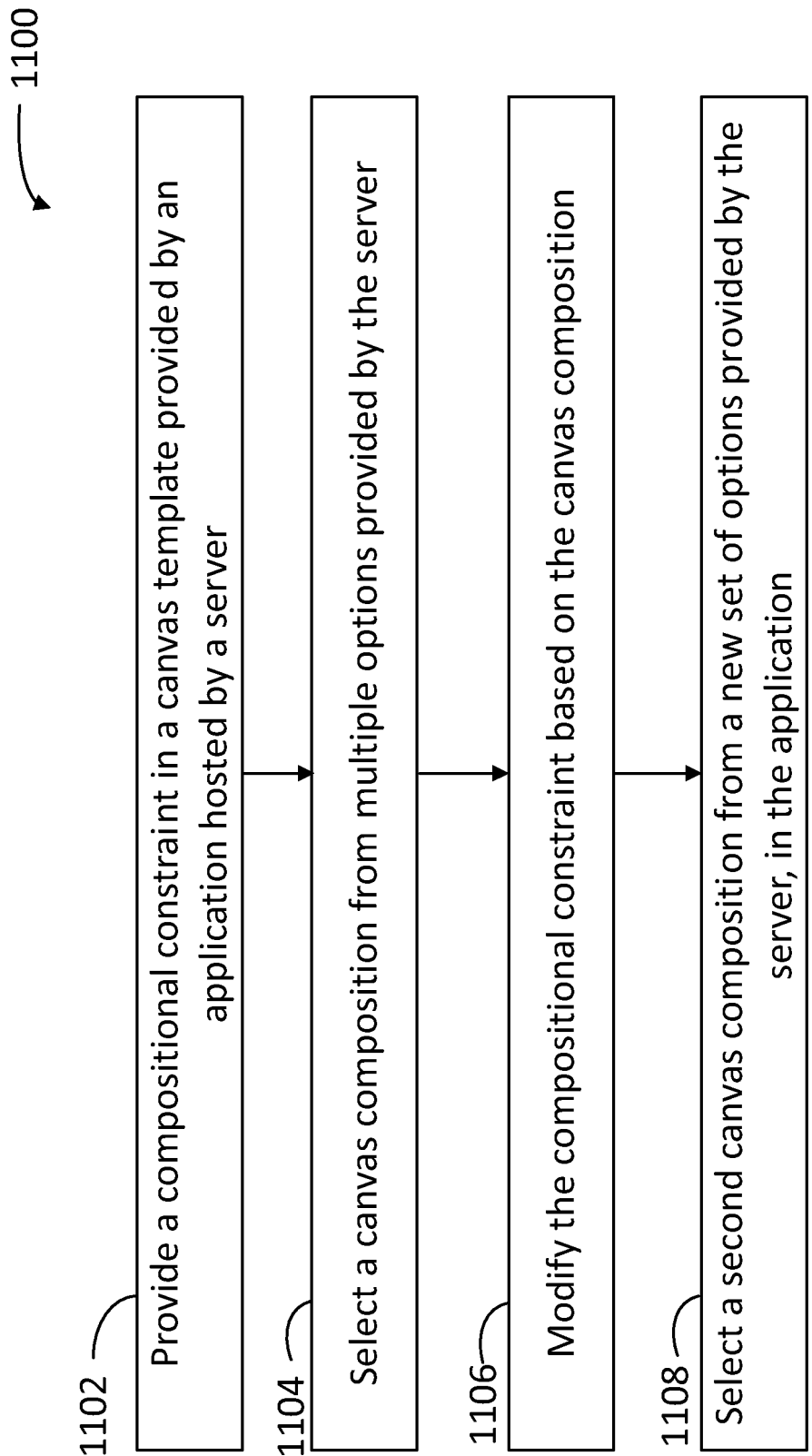
FIG. 11 is a flow chart illustrating steps in a method for composing a canvas using image anchors and generative adversarial networks, according to some embodiments.

FIG. 11 is a flow chart illustrating steps in a method 1100 for composing a canvas using image anchors and generative adversarial networks, according to some embodiments. Method 1100 may be performed at least partially by any one of servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application (e.g., applications 222, 422, and 622). At least some of the steps in method 1100 may be performed by a computer having a processor executing commands stored in a memory of the computer (e.g., processors 212 and 236, and memory 232). Further, steps as disclosed in method 1100 may include retrieving, editing, and/or storing files in an image database that is part of, or is communicably coupled to, the computer, using, inter-alia, a CGAN engine (e.g., image database 252 and CGAN engine 240). The CGAN engine may include a deep vision tool to embed images into an embedded space, a merge tool to transfer images between the embedded space and a merged space, a generative tool to form synthetic images from merged vectors, and a discriminative tool to determine how realistic a synthetic image is (e.g., deep vision tool 242, merge tool 244, generative tool 246, discriminative tool 248, embedded spaces 250 and 350, and merged spaces 251 and 551). The merged space may include dimensions associated with image context, and dimensions associated with image location within a canvas. Methods consistent with the present disclosure may include at least some, but not all, of the steps illustrated in method 1100, performed in a different sequence. Furthermore, methods consistent with the present disclosure may include at least two or more steps as in method 1100 performed overlapping in time, or almost simultaneously.

Step 1102 includes providing a compositional constraint in a canvas template provided by the application hosted by the server. In some embodiments, step 1102 includes selecting an image, an anchor point, a size, and a shape for the image to be placed in the canvas composition. In some embodiments, step 1102 includes providing multiple images for merging in a canvas template provided by an application hosted by a server.

Step 1104 includes selecting a canvas composition from multiple options provided by the server.

Step 1106 includes modifying the compositional constraint based on the canvas composition. In some embodiments, the compositional constraint includes a pre-selected threshold for synthetic detectability, and step 1106 includes reducing the pre-selected threshold for synthetic detectability. In some embodiments, step 1106 includes modifying one of the size, shape, or the location in the canvas of the at least one image.

Step 1108 includes selecting a second canvas composition from a new set of options provided by the server, in the application. In some embodiments, step 1108 further includes adding a text query on a location in the canvas for modifying the location in the canvas according to the text query.

Hardware Overview

Figure 12:
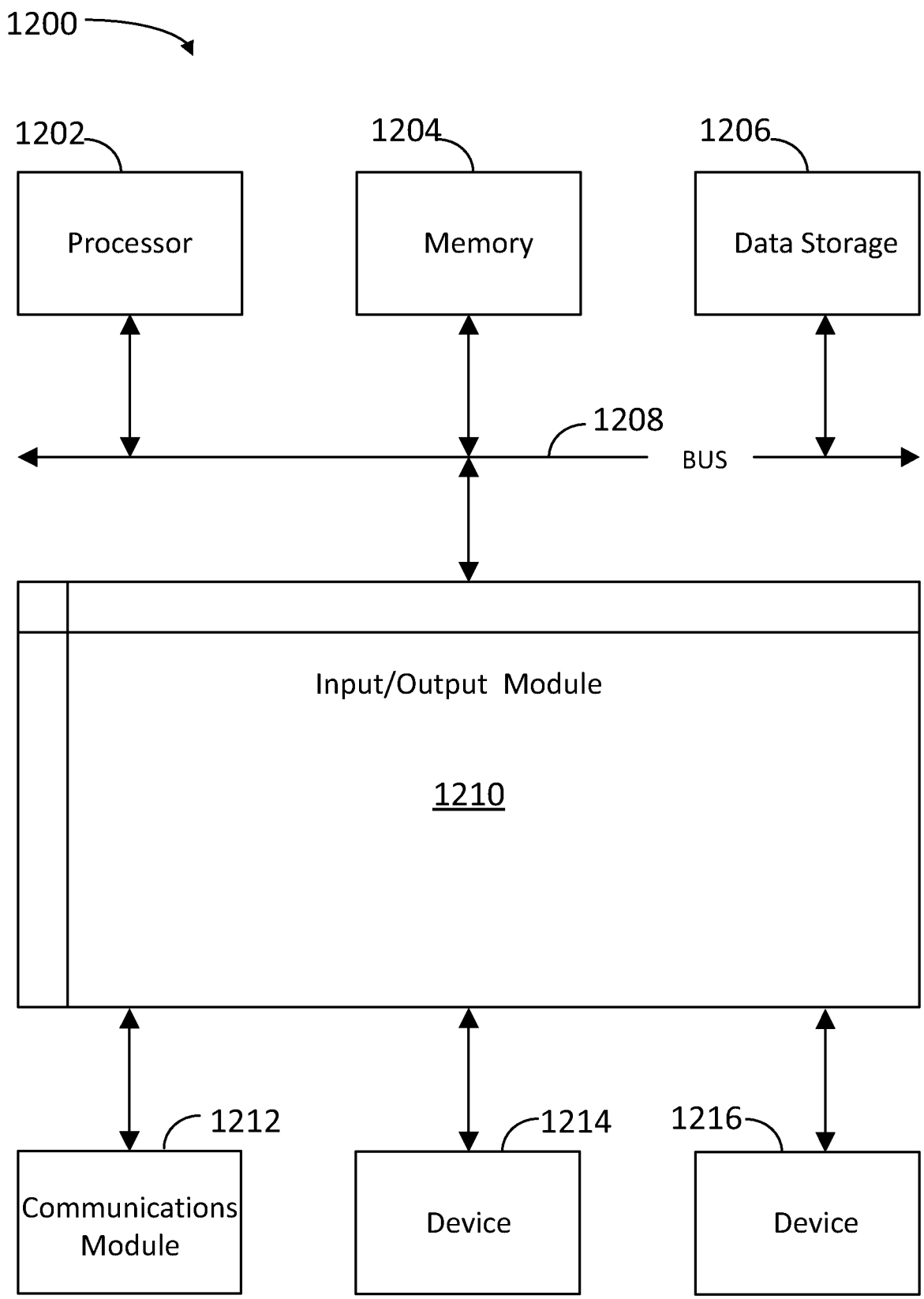
FIG. 12 is a block diagram illustrating an example computer system with which the client and server of FIGS. 1 and 2 and the methods of FIGS. 7-11 can be implemented.

FIG. 12 is a block diagram illustrating an exemplary computer system 1200 with which the client 120 and server 130 of FIGS. 1 and 2, and the methods of FIGS. 6 and 7 can be implemented. In certain aspects, the computer system 1200 may be implemented using hardware or a combination of software and hardware, either in a dedicated server, or integrated into another entity, or distributed across multiple entities.

Computer system 1200 (e.g., client 110 and server 130) includes a bus 1208 or other communication mechanism for communicating information, and a processor 1202 (e.g., processors 212 and 236) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, e.g., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. Input/output module 1210 can be any input/output module. Exemplary input/output modules 1210 include data ports such as USB ports. The input/output module 1210 is configured to connect to a communications module 1212. Exemplary communications modules 1212 (e.g., communications modules 218 and 238) include networking interface cards, such as Ethernet cards and modems. In certain aspects, input/output module 1210 is configured to connect to a plurality of devices, such as an input device 1214 (e.g., input device 214) and/or an output device 1216 (e.g., output device 216). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1216 include display devices, such as an LCD (liquid crystal display) monitor, for displaying information to the user.

According to one aspect of the present disclosure, the client 110 and server 130 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires forming bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving a compositional constraint from a user for merging multiple images to create a canvas;
finding a vector for the canvas in a merged space associated with the compositional constraint;
generating a synthetic image for the canvas based on the vector for the canvas and a generative tool trained in a generative adversarial configuration against a discriminative tool; and
providing the synthetic image for the canvas to a user when the discriminative tool identifies the synthetic image as a real image, wherein generating a synthetic image for the canvas comprises merging a first saliency measure for a first image in the canvas with a second saliency measure for a second image in the canvas to form a compound saliency measure associated with the vector for the canvas in the merged space.

2. The computer-implemented method of claim 1, wherein receiving a compositional constraint comprises receiving a positional constraint within the canvas for at least one of the images.

3. The computer-implemented method of claim 1, wherein generating a synthetic image for the canvas comprises relaxing a positional condition for at least two images within the canvas.

4. The computer-implemented method of claim 1, wherein generating a synthetic image for the canvas comprises determining a synthetic to real distance indicative of how close the synthetic image is from a real source image.

5. The computer-implemented method of claim 1, wherein generating a synthetic image for the canvas based on the vector for the canvas comprises generating, in an embedded vector space, a single feature vector based on multiple positional feature vectors for each of the images in the merged space.

6. The computer-implemented method of claim 1, wherein generating a synthetic image for the canvas comprises obtaining a loss factor from the discriminative tool with the vector for the canvas in the merged space, and modifying the vector for the canvas in the merged space when the loss factor is greater than a selected threshold.

7. The computer-implemented method of claim 1, wherein generating a synthetic image for the canvas comprises subtracting a spatial feature vector from the vector for the canvas in the merged space to obtain a residual vector, and determining a loss factor using a deep vision tool based on a context of the residual vector.

8. The computer-implemented method of claim 1, further comprising associating the synthetic image with a synthetic label and storing the synthetic image and the synthetic label in an image database for training the discriminative tool.

9. The computer-implemented method of claim 1, further comprising modifying a coefficient of the generative tool when the discriminative tool recognizes the synthetic image as synthetic.

10. The computer-implemented method of claim 1, further comprising modifying a coefficient of the discriminative tool to recognize the synthetic image as synthetic.

11. A system comprising:
one or more processors; and
a memory coupled to the one or more processors, the memory including instructions that, when executed by the one or more processors, cause the one or more processors to:
receive a compositional constraint from a user for creating a canvas merging multiple images;
find a vector for the canvas in a merged space associated with the compositional constraint;
generate a synthetic image for the canvas based on the vector for the canvas and a generative tool trained in a generative adversarial configuration against a discriminative tool; and
provide the synthetic image for the canvas to a user when the discriminative tool identifies the synthetic image as a real image, wherein to generate a synthetic image for the canvas the one or more processors are configured to merge a first saliency measure for a first image in the canvas with a second saliency measure for a second image in the canvas to form a compound saliency measure associated with the vector for the canvas in the merged space.

12. The system of claim 11, wherein to receive a compositional constraint the one or more processors are configured to receive a positional constraint within the canvas for at least one of the images.

13. The system of claim 11, wherein to generate a synthetic image for the canvas the one or more processors are configured to relax a positional condition for at least two images within the canvas.

14. The system of claim 11, wherein to generate a synthetic image for the canvas the one or more processors are configured to determine a synthetic to real distance indicative of how close the synthetic image is from a real source image.

15. The system of claim 11, wherein to generate a synthetic image for the canvas based on the vector for the canvas the one or more processors are configured to generate, in an embedded vector space, a single feature vector based on multiple positional feature vectors for each of the images in the merged space.

16. The system of claim 11, wherein to generate a synthetic image for the canvas the one or more processors are configured to obtain a loss factor from the discriminative tool with the vector for the canvas in the merged space, and to modify the vector for the canvas in the merged space when the loss factor is greater than a selected threshold.

17. The system of claim 11, wherein to generate a synthetic image for the canvas the one or more processors are configured to subtract a spatial feature vector from the vector for the canvas in the merged space to obtain a residual vector, and determining a loss factor using a deep vision tool based on a context of the residual vector.

* * * * *